United States Patent
Kamasuka

(10) Patent No.: US 10,778,861 B2
(45) Date of Patent: Sep. 15, 2020

(54) IMAGE FORMING APPARATUS, METHOD FOR CONTROLLING IMAGE FORMING APPARATUS, AND STORAGE MEDIUM CONFIGURED TO CHANGE UPDATE PROCESSING CONTROL DEPENDING ON WHETHER AN UPDATE TARGET APPLICATION IS OF A TYPE FOR OFFERING AN AUTHENTICATION FUNCTION

(71) Applicant: CANON KABUSHIKI KAISHA, Tokyo (JP)

(72) Inventor: Atsushi Kamasuka, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/709,927

(22) Filed: Sep. 20, 2017

(65) Prior Publication Data
US 2018/0091682 A1    Mar. 29, 2018

(30) Foreign Application Priority Data
Sep. 23, 2016    (JP) .................................. 2016-186029

(51) Int. Cl.
| H04N 1/00 | (2006.01) |
| G06F 21/57 | (2013.01) |
| G06F 21/60 | (2013.01) |
| G06F 21/31 | (2013.01) |

(52) U.S. Cl.
CPC ......... *H04N 1/00938* (2013.01); *G06F 21/57* (2013.01); *H04N 1/0097* (2013.01); *H04N 1/00244* (2013.01); *G06F 21/31* (2013.01); *G06F 21/608* (2013.01); *H04N 2201/0094* (2013.01)

(58) Field of Classification Search
CPC combination set(s) only.
See application file for complete search history.

(56) References Cited

U.S. PATENT DOCUMENTS

| 8,997,079 B2 * | 3/2015 | Kuroki | G06F 8/654 |
| | | | 717/168 |
| 2008/0263540 A1 * | 10/2008 | Bando | G06F 8/658 |
| | | | 717/173 |
| 2009/0064125 A1 | 3/2009 | Venkatachalam et al. | |

(Continued)

FOREIGN PATENT DOCUMENTS

| EP | 2328084 A1 | 6/2011 |
| JP | 2011-170465 A | 9/2011 |

*Primary Examiner* — Ibrahim Siddo
(74) *Attorney, Agent, or Firm* — Canon U.S.A., Inc. IP Division

(57) ABSTRACT

An image forming apparatus to which an application program for extending functions of the image forming apparatus is installed, the image forming apparatus includes an operation unit, at least one processor, when the processor executes instructions, which acts as an update unit configured to, in accordance with reception of an instruction for updating a login application, update the login application, the login application being an application program for authenticating a user who logs in to the image forming apparatus, and a control unit configured to, in accordance with the update unit performing processing for updating the login application, limit operations on the operation unit.

10 Claims, 12 Drawing Sheets

(56) References Cited

U.S. PATENT DOCUMENTS

| | | | | |
|---|---|---|---|---|
| 2010/0050247 A1* | 2/2010 | Hashimoto | ............ | G06F 21/335 |
| | | | | 726/10 |
| 2010/0157989 A1* | 6/2010 | Krzyzanowski | ........ | G06F 9/452 |
| | | | | 370/352 |
| 2011/0125899 A1* | 5/2011 | Yamamoto | .......... | G06F 17/3028 |
| | | | | 709/225 |
| 2014/0289864 A1* | 9/2014 | Dimitrakos | ............. | G06F 21/53 |
| | | | | 726/26 |
| 2015/0242721 A1* | 8/2015 | Hayami | ............. | G06K 15/4045 |
| | | | | 358/1.15 |
| 2016/0357981 A1* | 12/2016 | Tzeng | ................ | G06F 21/6218 |

* cited by examiner

FIG. 7

| | App Name | App ID | Type | Status | ON/OFF | Updating | Running |
|---|---|---|---|---|---|---|---|
| | | 602 | 603 | 604 | 605 | 606 | 607 |
| 610 | ID Card Copy | 1111-2222-3333-4444 | Job | Activated | ON | 0 | 0 |
| 611 | Form Print | 2222-3333-4444-5555 | Job | Activated | ON | 0 | 1 |
| 612 | ID Authentication | 3333-4444-5555-6666 | Auth | Activated | ON | 0 | 1 |
| 613 | Screen Show | 4444-5555-6666-7777 | Wallpaper | Activated | OFF | 0 | 0 |
| | Easy Fax | 5555-6666-7777-8888 | Job | — | — | 0 | 0 |
| 620 | User Auth | 6666-7777-8888-9999 | Auth | Activated | OFF | 0 | 0 |

FIG. 8

Application List

| App Name | Type | Status | ON/OFF | Control | |
|---|---|---|---|---|---|
| ID Card Copy | Job | Activated | ■ON □OFF | Deactivate | Uninstall |
| Form Print | Job | Activated | ■ON □OFF | Deactivate | Uninstall |
| ID Authentication | Auth | Activated | ■ON □OFF | Deactivate | Uninstall |
| Screen Show | Wallpaper | Activated | □ON ■OFF | Activate | Uninstall |
| Easy Fax | Job | — | — | Deactivate | Uninstall |
| User Auth | Auth | Activated | □ON ■OFF | Deactivate | Uninstall |

OK  Cancel

IMAGE FORMING APPARATUS, METHOD FOR CONTROLLING IMAGE FORMING APPARATUS, AND STORAGE MEDIUM CONFIGURED TO CHANGE UPDATE PROCESSING CONTROL DEPENDING ON WHETHER AN UPDATE TARGET APPLICATION IS OF A TYPE FOR OFFERING AN AUTHENTICATION FUNCTION

BACKGROUND OF THE INVENTION

Field of the Invention

The present disclosure relates to an image forming apparatus, a method for controlling the image forming apparatus, and a storage medium.

Description of the Related Art

There is a technique for installing, on a firmware for controlling an apparatus, programs which are loadable and different from the firmware (hereinafter referred to as applications) in order to allow diverse services to be usable on the apparatus.

Applications are installed, and additional functions and services are offered on diverse information processing apparatuses such as smart phones, tablet type information terminals, and also multifunction peripherals for office use.

When updating an application from a tablet type information terminal, a user having been notified that an update program of an application is available accesses an application selling site from the device and updates the target application. Meanwhile, in the case of a multifunction peripheral, another method is used. More specifically, a service engineer or an administrator prepares a required package and updates an application. Japanese Patent Application Laid-Open No. 2011-170465 discusses a technique such as an application distribution system for performing centralized management of application updates to simplify update processing.

To update an application, it is necessary to shut down the update target application in advance. In a case where an update target application is an application offering a function of authenticating a user of a device, shutdown of the update target application disables the user authentication. This may sometimes lead to a situation where unspecified users are allowed to freely operate the device.

SUMMARY OF THE INVENTION

The present disclosure is directed to changing update processing control depending on whether an update target application is of a type for offering an authentication function.

According to an aspect of the present disclosure, an image forming apparatus to which an application program for extending functions of the image forming apparatus is installed, the image forming apparatus includes an operation unit, at least one processor, when the processor executes instructions, which acts as an update unit configured to, in accordance with reception of an instruction for updating a login application, update the login application, the login application being an application program for authenticating a user who logs in to the image forming apparatus, and a control unit configured to, in accordance with the update unit performing processing for updating the login application, limit operations on the operation unit.

Further features of the present invention will become apparent from the following description of exemplary embodiments with reference to the attached drawings.

BRIEF DESCRIPTION OF THE DRAWINGS

FIG. 7 illustrates an example of application information.

FIG. 8 illustrates an example of an application management screen.

DESCRIPTION OF THE EMBODIMENTS

Exemplary embodiments of the present invention will be described below with reference to the accompanying drawings.

Figure 1:
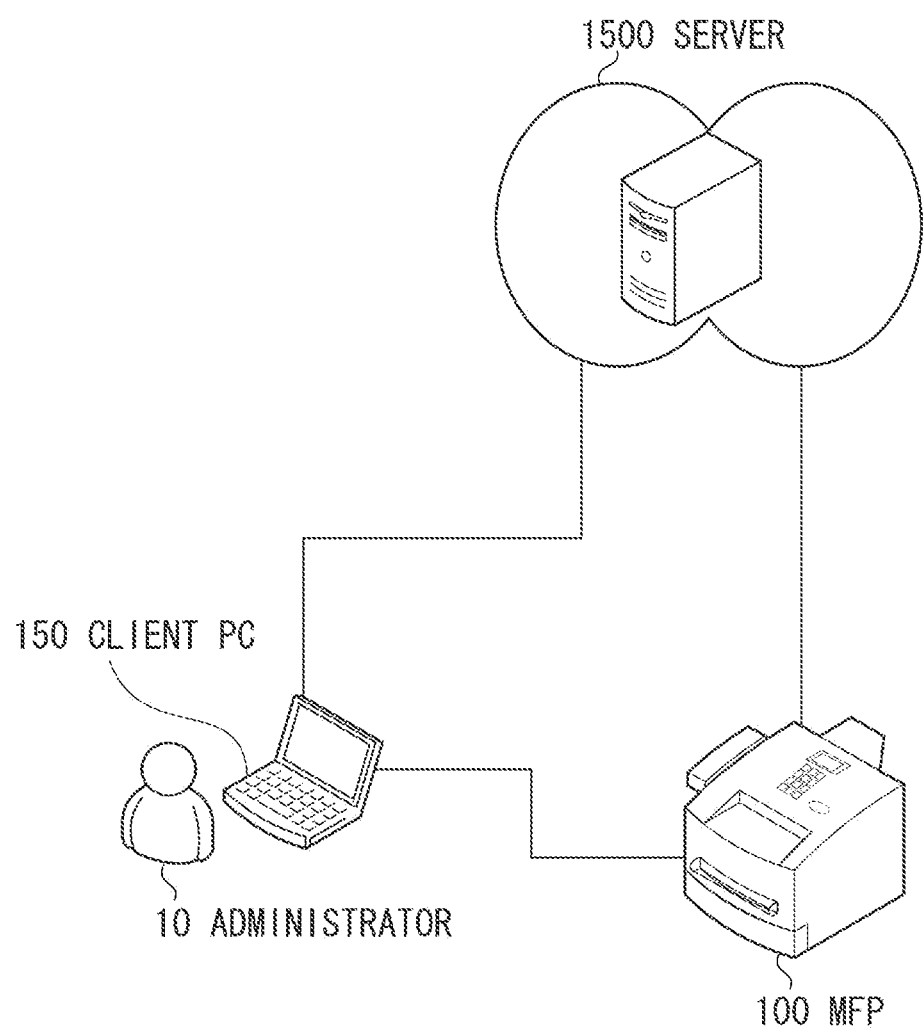
FIG. 1 illustrates an example of a system configuration of an update system.

FIG. 1 illustrates an example of a system configuration of an update system according to the present exemplary embodiment. The update system includes a multifunction peripheral (MFP) 100, a client personal computer (PC) 150, and a server 1500.

The MFP 100 is an image forming apparatus in which various applications are installed. The MFP 100 is an example of an information processing apparatus in which applications to be updated by the update system according to the present exemplary embodiment are installed.

The client PC 150 is an information processing apparatus, such as a personal computer (PC) and a tablet terminal apparatus, which is used by an administrator 10 who performs operations related to update of applications installed in the MFP 100.

The administrator 10 accesses the MFP 100 by using the client PC 150 and performs management operations including update of applications installed in the MFP 100. Although a person in charge in a vendor, sales outlet, or dealer is assumed as the administrator 10, the administrator 10 may also be an information technology (IT) administrator of an organization or a general user.

The server 1500 is an information processing apparatus, such as a PC and a server apparatus for managing data required to update applications.

The client PC 150 can access the MFP 100 and specify, on the basis of an operation of the administrator 10 via an operation unit (for example, an interface such as an operation screen) of the MFP 100, an update target application and instruct the MFP 100 to update the specified update target application. Further, the client PC 150 can access web service functions offered by the MFP 100 by using a web browser of the client PC 150.

The client PC 150 may access the server 1500, specify an update target application and the MFP 100 in which the application has been installed, and instruct the server 1500 to update the application installed in the MFP 100. Alternatively, in accordance with an operation by the administrator 10, the update system may perform update of an application which has been installed in the MFP 100 and set to be updated at a set timing, on the basis of a preset task schedule.

Figure 2:
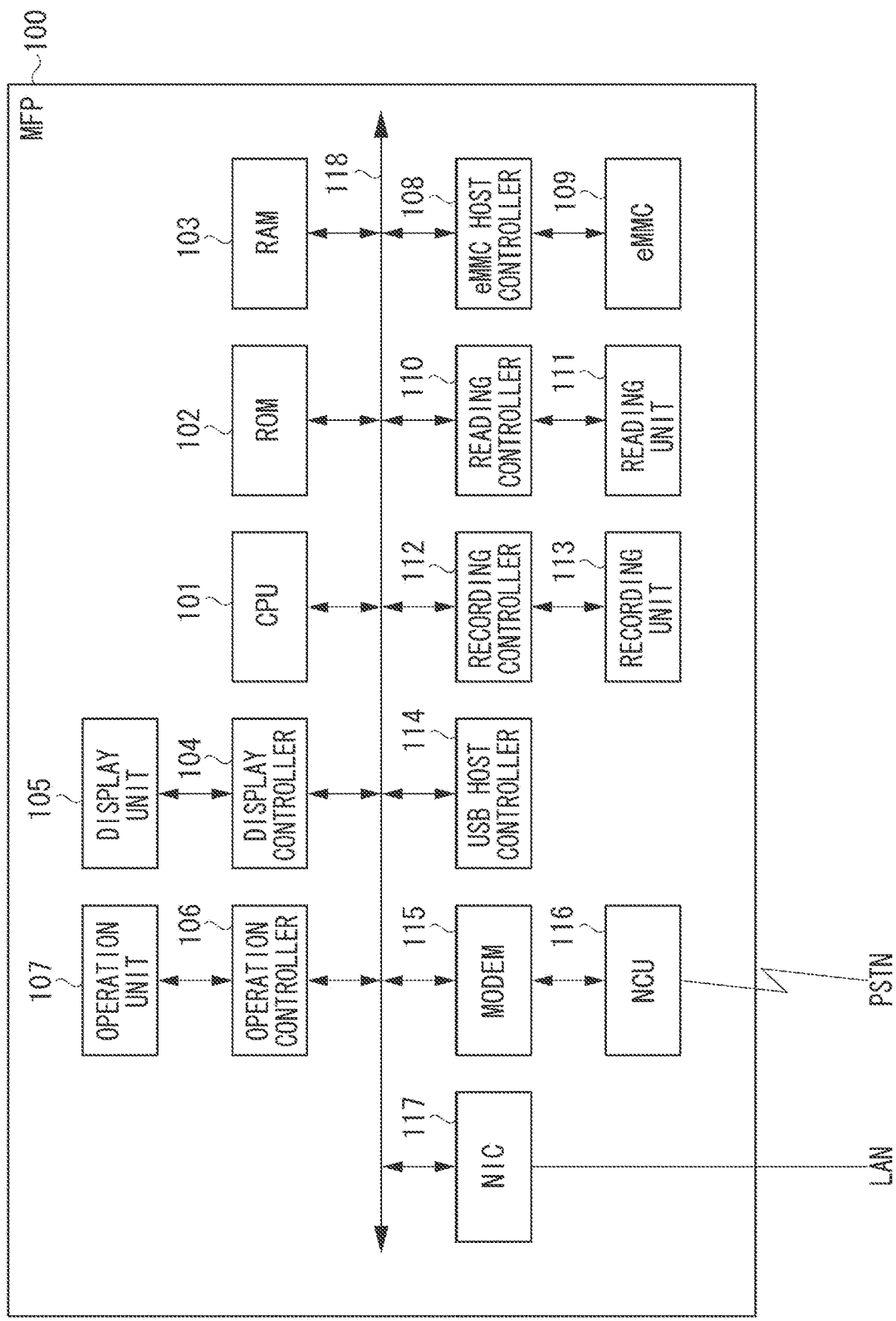
FIG. 2 illustrates an example of a hardware configuration of a multifunction peripheral (MFP).

FIG. 2 illustrates an example of a hardware configuration of the MFP 100 according to the present exemplary embodiment. The MFP 100 includes a central processing unit (CPU) 101, a read only memory (ROM) 102, a random access memory (RAM) 103, a display controller 104, a display unit 105, an operation controller 106, and an operation unit 107. The MFP 100 further includes an embedded Multi Media Card (eMMC) host controller 108, an eMMC 109, a reading controller 110, a reading unit 111, a recording controller 112, and a recording unit 113. The MFP 100 further includes a universal serial bus (USB) host controller 114, a modulator/demodulator (modem) 115, a network control unit (NCU) 116, and a network interface card (NIC) 117. Hardware components 101 to 104, 106, 108, 110, 112, 114, 115, and 117 of the MFP 100 are mutually connected via a system bus 118.

The CPU 101 is a central processing unit for totally controlling devices connected to the system bus 118. When supplied with power, the CPU 101 executes a boot program stored in the ROM 102. When the CPU 101 executes the boot program, the CPU 101 loads a main program stored in a storage into the RAM 103 and executes processing from the beginning of the loaded main program. The ROM 102 is a storage device for storing the boot program. The RAM 103 is a storage device which functions as a location for loading the main program and also as a work area for the main program.

The display controller 104 is a controller for controlling the drawing on the display unit 105. The display unit 105 is a liquid crystal display (LCD) capable of displaying character strings of 28 characters by 7 rows, ruled lines, and scroll bars. The operation controller 106 controls inputs from the operation unit 107 provided on the MFP 100. The operation unit 107 includes input apparatuses, such as numeric keypads, cursor keys, one-touch keys, and a touch panel superimposed on the display unit 105. A user can input information to the MFP 100 by operating the operation unit 107.

The reading unit 111 includes a scanner for reading a document. The reading unit 111 provided with an automatic document feeder as an option is capable of automatically reading a plurality of document sheets. The reading controller 110 connected to the reading unit 111 is used to control the reading unit 111.

The recording unit 113 forms an image by using an electrophotographic process. The recording controller 112 connected to the recording unit 113 is used to control the recording unit 113.

The USB host controller 114 is in charge of USB protocol control and mediates access to a USB device, such as a USB memory.

The modem 115 modulates and demodulates signals required for facsimile communication. The modem 115 is connected to the NCU 116. The NCU 116 sends out a signal modulated by the modem 115 to a Public Switched Telephone Network (PSTN).

The NIC 117 is a network interface card for performing bidirectional exchange of mail and data with the server 1500 through a local area network (LAN).

The MFP 100 according to the present exemplary embodiment includes the eMMC 109 as a storage device. The eMMC host controller 108 controls the eMMC 109. The CPU 101 accesses the eMMC 109 via the eMMC host controller 108.

When the CPU 101 performs processing on the basis of a program stored in the ROM 102 and the eMMC 109, the functions of the MFP 100 (described below with reference to FIG. 4) and processing in the flowchart (described below with reference to FIG. 9) are implemented.

Figure 3:
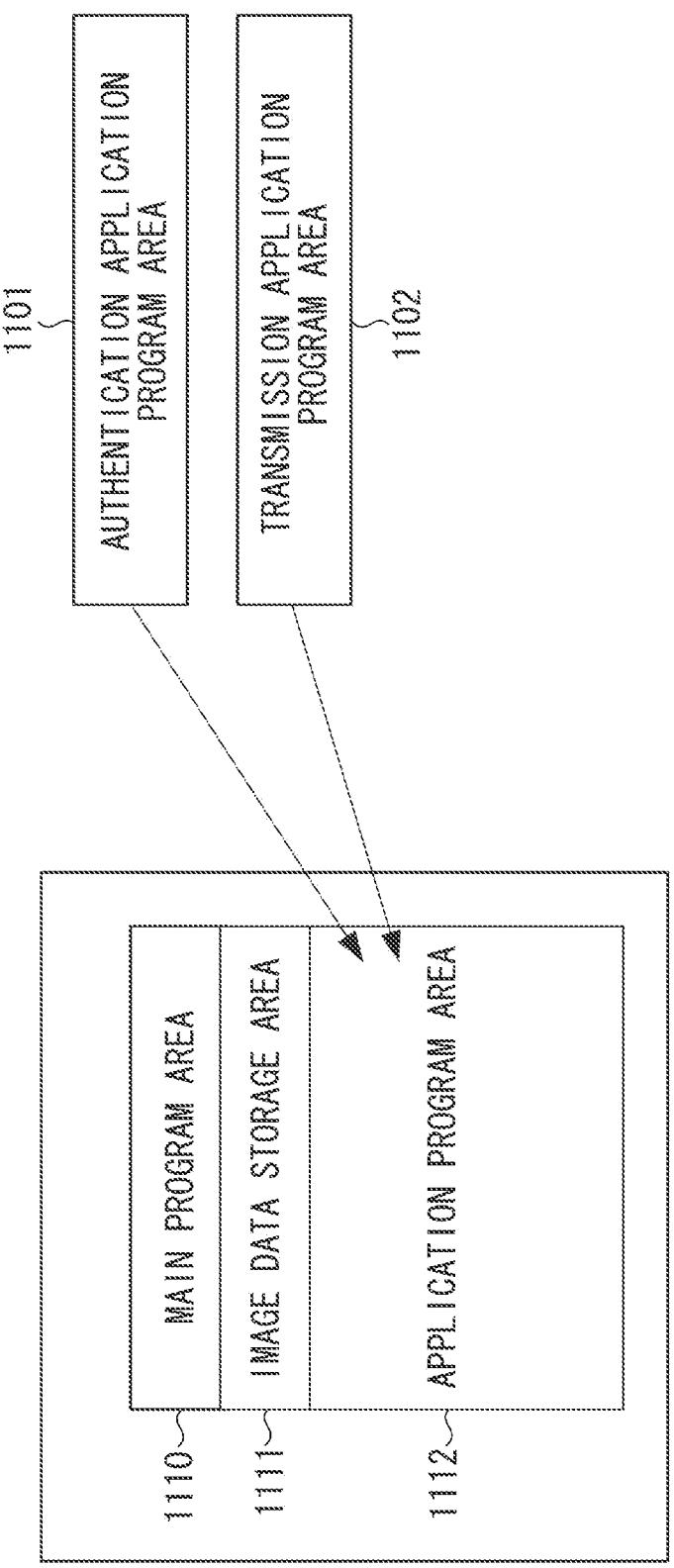
FIG. 3 illustrates details of an example of a storage area of an embedded Multi Media Card (eMMC).

FIG. 3 illustrates details of an example of a storage area of the eMMC 109.

The storage area in the eMMC 109 is divided into a plurality of areas including a main program area 1110, an image data storage area 1111, and an application program area 1112, depending on use. The main program area 1110 is an area storing the main program for operating the MFP 100 main body. The image data storage area 1111 is an area storing information about received images. The application program area 1112 is an area storing application programs and data which are additionally installed in the MFP 100. The application program area 1112 includes areas storing data of a plurality of applications. The application program area 1112 includes an authentication application program area 1101 as an area for storing the program of the authentication application which is used for user authentication. The application program area 1112 further includes a transmission application program area 1102 for storing the program of the transmission application which is used for data transmission.

Figure 4:
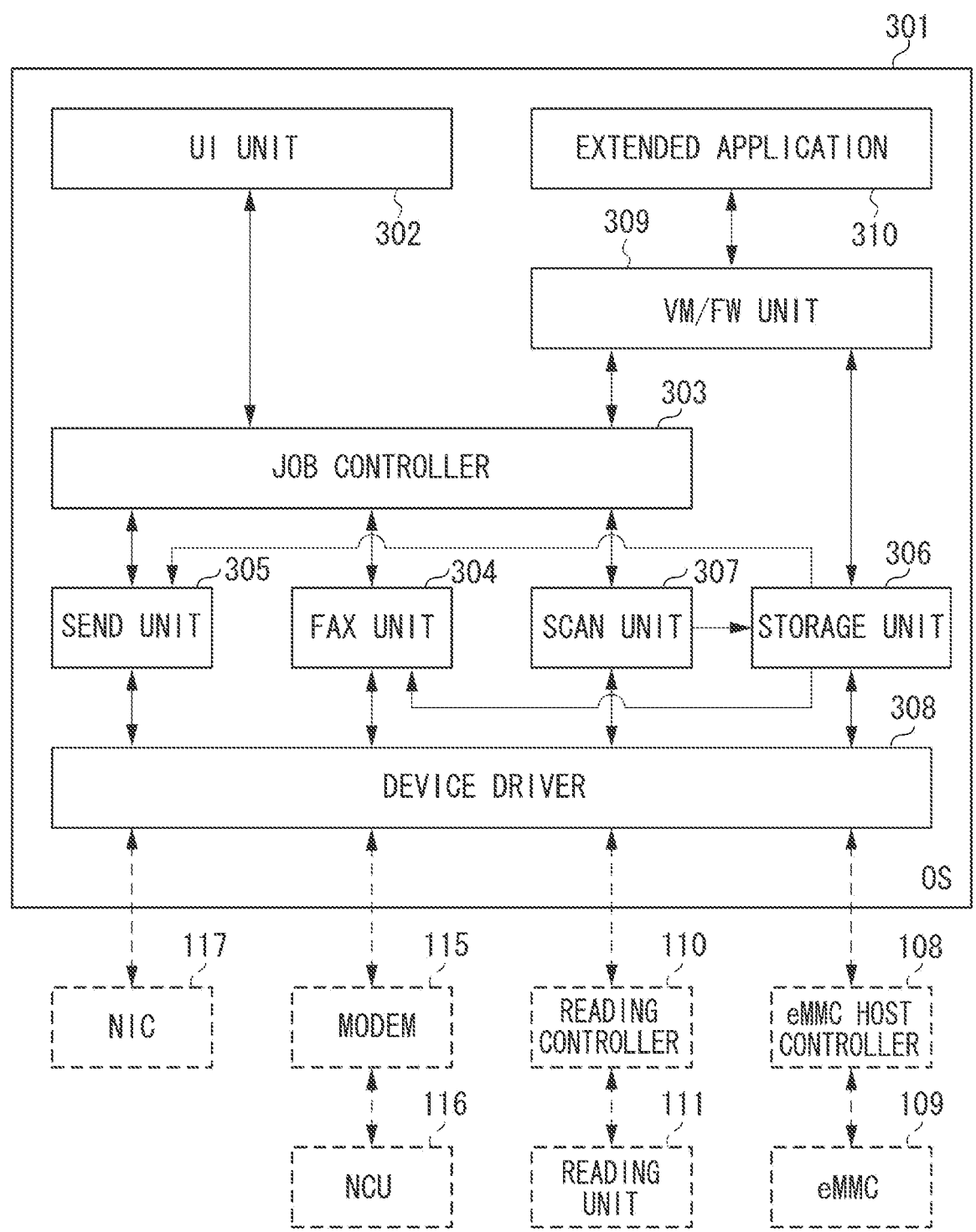
FIG. 4 illustrates an example of a functional configuration of the MFP.

FIG. 4 illustrates an example of a functional configuration of the MFP 100 according to the present exemplary embodiment. Each of components drawn by solid lines in FIG. 4 is a software module implemented when the CPU 101 executes the main program loaded into the RAM 103 at the time of execution of the boot program.

An operating system (OS) 301 manages and controls processing of each software module. The OS 301 includes an user interface (UI) unit 302, a job controller 303, a fax unit 304, a send unit 305, a storage unit 306, a scan unit 307, a device driver 308, a virtual machine (VM)/framework (FW) unit 309, and an extended application 310.

The device driver 308 controls hardware devices including the NIC 117, the modem 115, the reading controller 110, and the eMMC host controller 108.

The UI unit 302 provides the user with a variety of information and at the same time receives various inputs from the user via the display unit 105 and the operation unit 107.

The job controller 303 receives a copy, a print, and a fax job, and controls execution of the received job.

The storage unit 306 is a software module for physically (electrically) storing data, for example, images and user setting information, in the eMMC 109.

The fax unit 304 and the send unit 305 acquire image data managed by the storage unit 306, and transmit data to a set destination via the modem 115 and the NCU 116 or via the NIC 117. For example, when the job controller 303 receives a job from the transmission application, the scan unit 307 controls the reading unit 111 to scan a document in accordance with the job request. Then, the scan unit 307 stores scanned image data in the eMMC 109 via the storage unit 306. The image data stored by the storage unit 306 is transferred to the fax unit 304 and the send unit 305 according to a specified protocol, and is transmitted to a set destination via the modem 115 and the NCU 116 or via the NIC 117.

The extended application 310 is composed of an arbitrary program written in a script language. The VM/FW unit 309 loads the program code and data of the application stored in the eMMC 109, and installs or uninstalls the application as the extended application 310. The program code and data of the extended application 310 include metadata indicating the type and version information of the application. The VM/FW unit 309 performs arbitration between a function implemented by the program of an arbitrary application installed as the extended application 310 and an existing function of the MFP 100. The VM/FW unit 309 interprets the script language of the program of an arbitrary application installed as the extended application 310 and executes the program. The VM/FW unit 309 is an example of a framework installed in the MFP 100.

The MFP 100 can additionally implement a function, such as a user authentication function, not offered as a device's original function of the MFP 100 at the time of shipment. The MFP 100 implements such a function as the function of the extended application 310. The extended application 310 is an example of an application which operates on a framework (on the VM/FW unit 309). An application is programmed so as to be executed according to a predetermined script.

Figure 5:
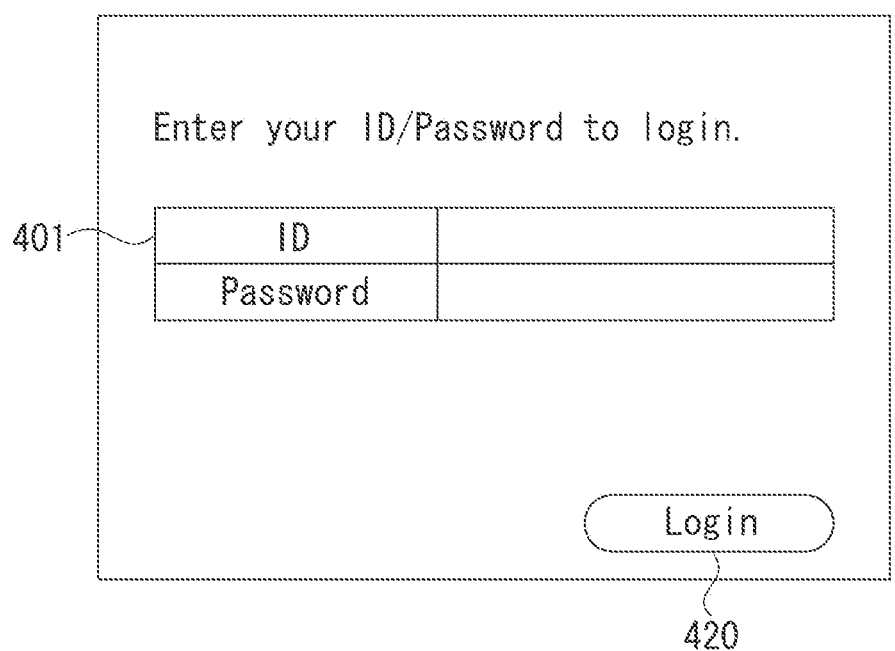
FIG. 5 illustrates an example of a screen displayed by an authentication application.

FIG. 5 illustrates an example of a screen displayed on the operation unit 107 by an authentication application installed in the MFP 100 and functionally enabled.

When using the MFP 100, the user inputs a valid identifier (ID) and password information 401 and selects a login button 420 via the display unit 105 and the operation unit 107 to log in to the MFP 100. If the user fails in authentication, the operation unit 107 of the MFP 100 continues displaying the screen illustrated in FIG. 5 under the control of the authentication application to prevent the user from operating the MFP 100. When the user succeeds in authentication, the display unit 105 changes the display screen to a home screen illustrated in FIG. 6. Thus, the user can use various functions offered by the MFP 100. The authentication application is one of a plurality of the extended applications 310. The authentication application is executed after power of the MFP 100 is turned ON and then the initialization is completed. Then, the authentication screen illustrated in FIG. 5 of the authentication application occupies the operation unit 107 of the MFP 100 as the initial screen of the MFP 100. In this way, the display processing of the initial screen using the authentication application can be set by the VM/FW unit 309.

Figure 6:
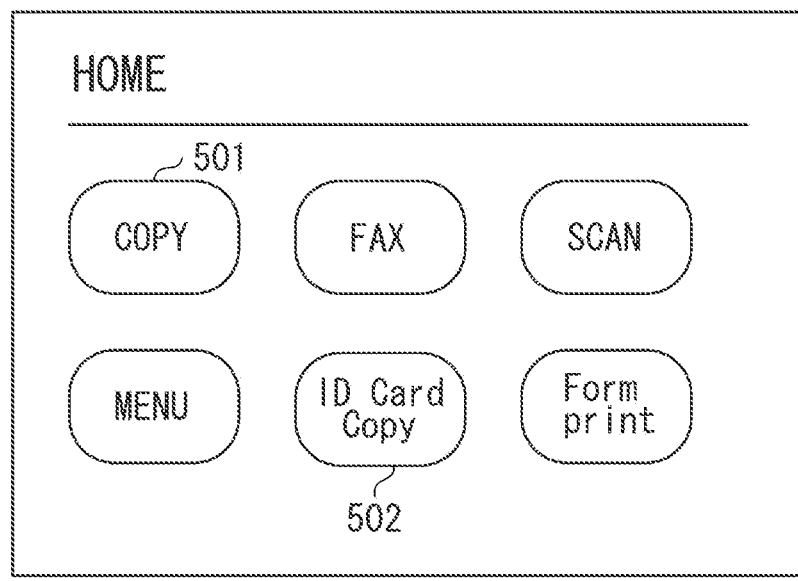
FIG. 6 illustrates an example of a home screen.

The home screen illustrated in FIG. 6 is a default screen of the MFP 100 also displayed in cases, other than a case where the user authentication by the authentication application succeeded, where the authentication application is not installed and where the authentication application is installed but the function of the authentication application is disabled.

The home screen includes buttons, in particular, a COPY button 501 to be selected for the copy function, a FAX button to be selected for the fax function, and a SCAN button to be selected for the scan function. The home screen further includes an ID Card Copy button 502 which is selected when the copy function of an ID card is used, and a button which is selected when an application function, such as Form Print, installed as the extended application 310 is used.

FIG. 7 illustrates an example of application information managed by the VM/FW unit 309 together with the extended application 310. As illustrated in FIG. 7, the application information includes a name (App Name) 601, an ID (App ID) 602, a type 603, an activated state (Status) 604, and an ON/OFF state 605 for each extended application 310. The application information is stored in the eMMC 109. According to the present exemplary embodiment, the application information is assumed to be data in a table format as illustrated in FIG. 7.

The name 601 indicates the name of an application. The ID 602 indicates the ID assigned to the application. The type 603 indicates the type of the extended application. The activated state 604 indicates whether the application is enabled (in the activated state). The ON/OFF state 605 indicates whether the application is enabled (ON) or not (OFF) in the activated state.

The application information includes an update state (Updating) 606 indicating whether the application is currently being updated and an execution state (Running) 607 indicating whether the application is currently being executed. When displaying the home screen, the UI unit 302 acquires the application information about the extended application 310 from the VM/FW unit 309, and displays only buttons for applications with which the activated state 604 is "Activated" and the ON/OFF state 605 is ON.

The type 603 stores information indicating the type of application, i.e., information indicating a job type, an authentication type, or a wallpaper type. The value of the type 603 is determined by the type attribute in the metadata included in each application. The job type indicates that the application executes a set job. The authentication type indicates that the application is used for user authentication. The wallpaper type indicates that the application displays a wallpaper. In the example illustrated in FIG. 7, the type 603 stores values "Job", "Auth", and "Wallpaper". The value "Job" indicates that the corresponding application is a job type application. The value "Auth" indicates that the corresponding application is an authentication type application. The value "Wallpaper" indicates that the corresponding application is a wallpaper type application.

The example illustrated in FIG. 7 indicates that six different applications (ID Card Copy 610 to User Auth 620) are installed in the MFP 100 as the extended applications 310. For example, Form Print 611 is a job type application and is already in the activated state and enabled (ON).

Form Print 611 is not currently in the update processing state but in the execution state. Meanwhile, Screen Show 613 is a wallpaper type application and is in the activated state. However, since Screen Show 613 is disabled (OFF), the corresponding button is not displayed in the home screen. The application is neither in the update processing state nor in the execution state.

Information of each application managed by the VM/FW unit 309 is also used for the application management screen illustrated in FIG. 8.

FIG. 8 illustrates an example of an application management screen which is used to manage the applications offered to the web browser of the client PC 150 accessed a set Uniform Resource Locator (URL), by the web service function of the MFP 100. The application management screen is used by the user, such as the administrator 10, to manage each application installed in the MFP 100. The application management screen includes application information managed by the VM/FW unit 309 described with reference to FIG. 7. The application management screen includes specification switches 701 to be used to switch the ON/OFF state 605 of each application, and controls 702 used to switch the activated state 604 of each application or specify uninstallation (Uninstall) thereof. When the CPU 101 detects the selection of an OK button 703, the CPU 101 updates the ON/OFF state 605 and the activated state 604 of each application on the basis of the state of the specification switches 701 and the controls 702. More specifically, the CPU 101 updates the contents of the application information illustrated in FIG. 7 via the VM/FW unit 309. When the CPU 101 detects the selection of the OK button 703 with "Uninstall" selected in the controls 702, the CPU 101 uninstalls the corresponding application from the MFP 100.

Figure 9:
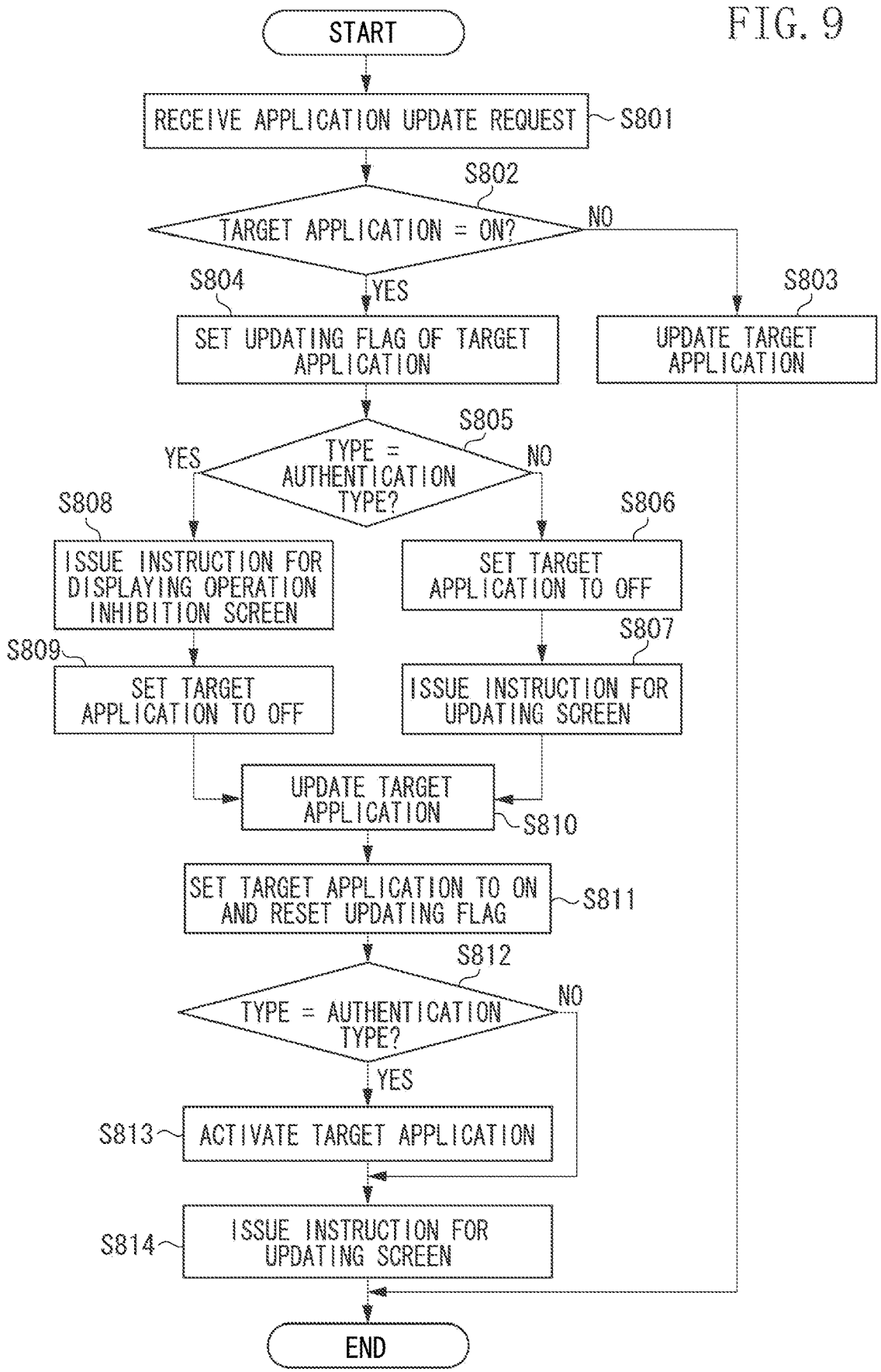
FIG. 9 is a flowchart illustrating an example of processing of the MFP.

FIG. 9 is a flowchart illustrating an example of processing of the MFP 100. The processing performed by the VM/FW unit 309 to update an application will be described below with reference to FIG. 9.

In step S801, the VM/FW unit 309 receives an instruction for updating an application. The VM/FW unit 309 receives from the client PC 150, for example, an instruction for updating an application together with information about the update target application. The VM/FW unit 309 may receive from the server 1500 an instruction for updating an application together with the information about the update target application. Hereinafter, the update target application corresponding to the instruction received in step S801 is referred to as a target application. The application specified to be updated in step S801 is an example of a first application.

According to the present exemplary embodiment, the VM/FW unit 309 receives an instruction for updating an application only once in step S801 and performs processing for updating the application only once. However, the VM/FW unit 309 may receive an instruction for periodically updating an application at set intervals (for example, every month) in step S801. In this case, the VM/FW unit 309 repeats the processing in steps S802 to S810 at set intervals to periodically update an application.

According to the present exemplary embodiment, the VM/FW unit 309 receives an instruction transmitted from the client PC 150 or the server 1500 to accept the instruction for updating an application in step S801. Alternatively, the VM/FW unit 309 may receive an instruction for updating an application on the basis of a user operation via the operation unit 107 in step S801.

In step S802, the VM/FW unit 309 determines whether the target application is enabled, on the basis of the application information. For example, when the value of the ON/OFF state 605 of the target application is ON in the table storing the application information, the VM/FW unit 309 determines that the target application is enabled. On the other hand, when the value of the ON/OFF state 605 of the target application is OFF in the table storing the application information, the VM/FW unit 309 determines that the target application is disabled.

In a case where the VM/FW unit 309 determines that the target application is enabled, on the basis of the application information (YES in step S802), the processing proceeds to step S804. On the other hand, in a case where the VM/FW unit 309 determines that the target application is disabled, on the basis of the application information (NO in step S802), the processing proceeds to step S803.

In step S803, the VM/FW unit 309 updates the target application, and the processing exits the procedure of the flowchart illustrated in FIG. 9.

In step S804, the VM/FW unit 309 sets a flag (updating flag) indicating that the target application is currently being updated. For example, the VM/FW unit 309 sets the value of the update state 606 of the target application to 1 in the table storing the application information.

In step S805, the VM/FW unit 309 determines whether the target application is an authentication type application. For example, when the value of the type 603 of the target application is "Ruth" in the table storing the application information, the VM/FW unit 309 determines the target application is an authentication type application. For example, when the value of the type 603 of the target application is not "Ruth" in the table storing the application information, the VM/FW unit 309 determines the target application is not an authentication type application. In a case where the VM/FW unit 309 determines that the target application is an authentication type application (YES in step S805), the processing proceeds to step S808. On the other hand, in a case where the VM/FW unit 309 determines that the target application is not an authentication type application (NO in step S805), the processing proceeds to step S806.

In step S806, the VM/FW unit 309 disables the target application. For example, the VM/FW unit 309 sets the value of the ON/OFF state 605 of the target application to OFF in the table storing the application information.

In step S807, the VM/FW unit 309 instructs the UI unit 302 to update the screen displayed on the display unit 105.

Figure 10:
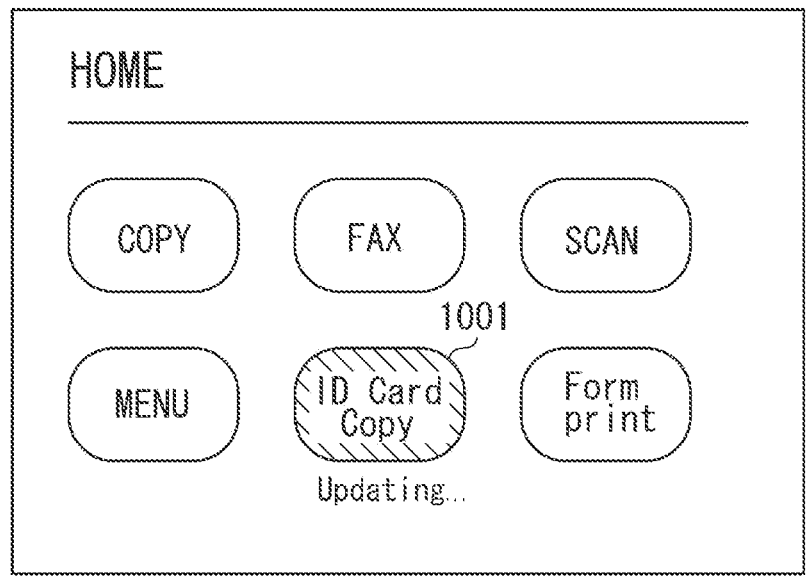
FIG. 10 illustrates an example of the home screen.

In the example illustrated in FIG. 6, since ID Card Copy as a job type application is originally in the enabled state (the value of the ON/OFF state 605 is ON), the corresponding button (the ID Card Copy button 502) is displayed in the home screen. However, in the processing in steps S804 and S806, the value of the ON/OFF state 605 of ID Card Copy 610 is changed to OFF and the value of the update state 606 thereof is changed to 1 in the table storing the application information illustrated in FIG. 7. Therefore, the UI unit 302 displays the home screen which does not include the button of ID Card Copy 610 according to the instruction issued in step S807. Alternatively, as indicated by a button 1001 illustrated in FIG. 10, the UI unit 302 may display the home screen which includes the ID Card Copy button displayed in the gray out state indicating that the button is disabled, together with a message notifying that the application is the currently being updated.

When update is specified for the application currently being executed (the value of the execution state 607 is 1), the VM/FW unit 309 may wait for the update processing until execution is canceled (the value of the execution state 607 becomes 0). Alternatively, when update is specified for the application currently being executed (the value of the execution state 607 is 1), the VM/FW unit 309 may forcibly cancel the execution state (set the value of the execution state 607 to 0).

Figure 11:
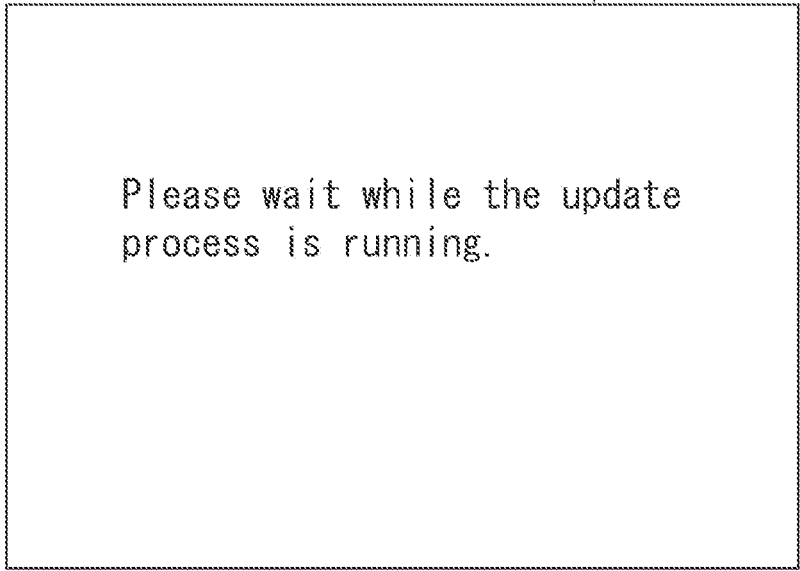
FIG. 11 illustrates an example of an operation inhibition screen.

In step S808, the VM/FW unit 309 instructs the UI unit 302 to display an operation inhibition screen indicating that operation is inhibited, illustrated in FIG. 11. The VM/FW unit 309 may instruct the UI unit 302 to display the screen using the gray out state indicating that operation is inhibited. Then, the VM/FW unit 309 performs control not to receive an input set via the operation unit 107. According to the present exemplary embodiment, the VM/FW unit 309 performs control to receive no input via the operation unit 107. However, the VM/FW unit 309 may perform control not to receive only an input for specifying execution of a set application out of inputs received via the operation unit 107. In this case, the VM/FW unit 309 may instruct the UI unit 302 to display the button corresponding to the set application in the gray out state.

In step S809, the VM/FW unit 309 disables the target application. For example, the VM/FW unit 309 sets the value of the ON/OFF state 605 of the target application to OFF in the table storing the application information.

In the example illustrated in FIG. 7, ID Authentication 612 as an authentication type application is installed in the MFP 100 and is currently being executed (the value of the execution state 607 is 1). Therefore, the authentication screen illustrated in FIG. 5 is displayed on the display unit 105. To update ID Authentication 612, the VM/FW unit 309 needs to once change the application to the disabled state (set the value of the ON/OFF state 605 to OFF). However, if ID Authentication 612 is disabled, the authentication function of the MFP 100 is lost and unspecified users are allowed to use the MFP 100.

According to the present exemplary embodiment, the VM/FW unit 309 performs processing to display the screen illustrated in FIG. 11 on the display unit 105 to inhibit operations on the operation unit 107 in step S808, and set the target application to OFF in step S809. Then, the MFP 100 does not receive accesses from unspecified users in a state where the authentication function is lost, and thus security is improved to a further extent. The MFP 100 may permit access to menus and items aiming to confirm error information and job situations (deletion of jobs is not permitted).

In step S810, the VM/FW unit 309 performs processing for updating the target application. For example, the MFP 100 requests the server 1500 to offer an update module to be used to update the target application, and stores in the eMMC 109 data of the update module received from the server 1500. For example, the MFP 100 may acquire, via the USB host controller 114, the update module of the target application from a USB storage device connected to the MFP 100.

The VM/FW unit 309 reads, via the storage unit 306, the data of the update module stored in the eMMC 109, and updates the target application by using the read update module. The VM/FW unit 309 includes a VM unit and an FW unit. The VM unit operating on the FW unit is a virtual machine, and is implemented by a Lua system which interprets and executes byte codes included in the application.

In step S811, the VM/FW unit 309 enables the updated target application. For example, the VM/FW unit 309 sets the value of the ON/OFF state 605 of the target application to ON and sets the value of the update state 606 thereof to 0 in the table storing the application information.

In step S812, the VM/FW unit 309 determines whether the target application is an authentication type application. In a case where the VM/FW unit 309 determines that the target application is an authentication type application (YES in step S812), the processing proceeds to step S813. On the other hand, in a case where the VM/FW unit 309 determines that the target application is not an authentication type application (NO in step S812), the processing proceeds to step S814.

In step S813, the VM/FW unit 309 activates the target application.

In step S814, the VM/FW unit 309 instructs the UI unit 302 to update the screen displayed on the display unit 105.

According to the present exemplary embodiment, when the update target application is an authentication type application, the MFP 100 performs control to receive no input via the operation unit 107 and updates the application. On the other hand, when the update target application is not an authentication type application, the MFP 100 updates the application without performing control to receive no input via the operation unit 107. Thus, the MFP 100 can change update processing control according to whether the update target application is of a type for offering an authentication function. The type of the update target application with which the update processing control is changed is not limited to a type for offering an authentication function and may be a type for offering a login function. Authentication can also be defined as authentication processing and login processing for receiving the authentication processing. It is natural that the present exemplary embodiment is applicable to an application for offering only an authentication receiving portion and an application for offering both reception and authentication. Hereinafter these applications are collectively referred to as login applications. This also applies to other exemplary embodiments described below.

Further, even while an authentication type application is not operating because of update, an unauthenticated user is unable to operate the MFP 100. Thus, the MFP 100 can lead to improvement in security.

When the update target application is not an authentication type application, the MFP 100 does not perform control to receive no input via the operation unit 107. Therefore, the MFP 100 does not limit operations even when the update target application is not an authentication type application. Thus, degradation of user convenience is prevented.

The MFP 100 can perform processing according to the present exemplary embodiment on the basis of an instruction from a remote location, such as an update instruction transmitted from the client PC 150. Therefore, the MFP 100 can lead to improvement in security even when update processing is performed according to an instruction for updating an application from a remote location. Conventionally, an operator visits the site of the MFP 100 and performs update operations to ensure security. The MFP 100 according to the present exemplary embodiment enables the operator to update an application with ensured security even without visiting the site of the MFP 100. More specifically, the MFP 100 can lead to reduction in the operator's travel time and cost.

According to the first exemplary embodiment, when the update target application is an authentication type application, the MFP 100 performs control not to receive information input via the operation unit 107 in order to disable operations on the operation unit 107. According to the present exemplary embodiment, when the update target application is an authentication type application, the MFP 100 checks whether another authentication type application exists and, when such an application exists, performs processing for activating the application.

The system configuration of the update system, and the hardware and functional configurations of the system components according to the present exemplary embodiment are similar to those according to the first exemplary embodiment.

Figure 12:
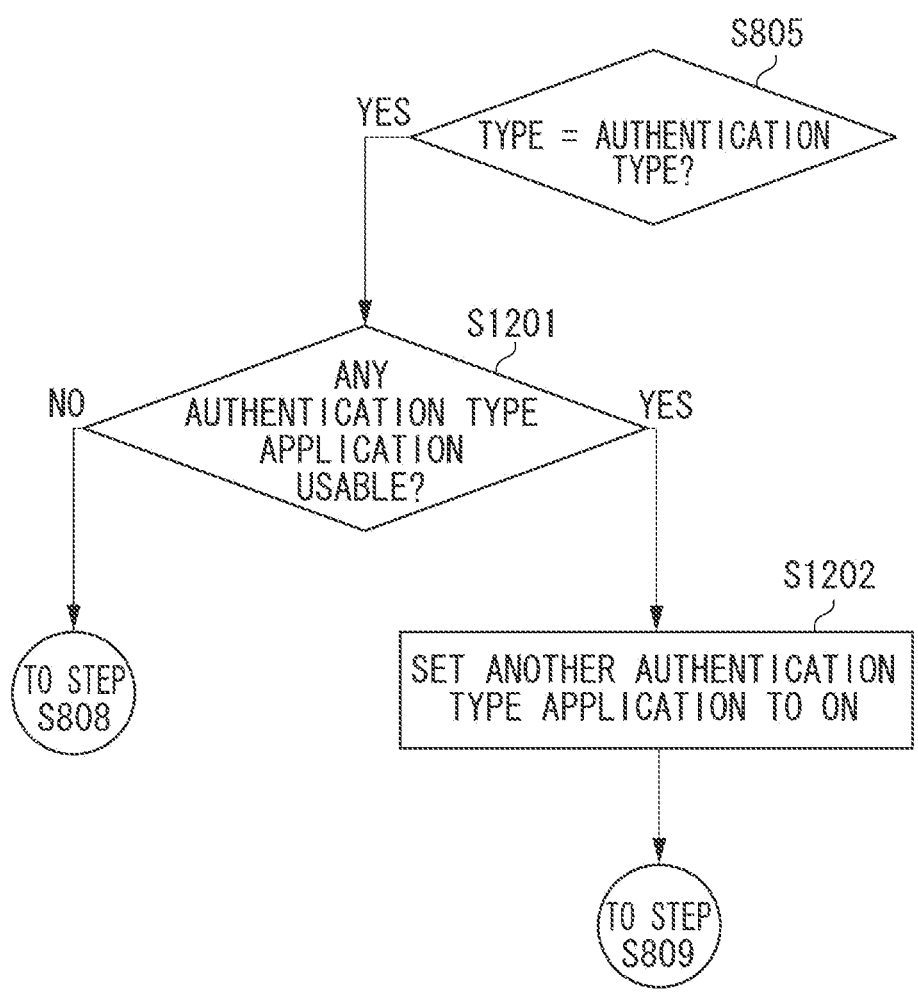
FIG. 12 is a flowchart illustrating an example of processing of the MFP.

FIG. 12 is a flowchart illustrating an example of processing of the MFP 100 according to the present exemplary embodiment. Processing according to the present exemplary embodiment differs from the processing illustrated in FIG. 9 according to the first exemplary embodiment in the processing after the update target application is determined to be an authentication type application in step S805 up to the processing in step S810. Other processing is similar to that according to the first exemplary embodiment. The flowchart illustrated in FIG. 12 indicates processing after the target application is determined to be an authentication type application in step S805.

In step S805, the VM/FW unit 309 determines whether the target application is an authentication type application.

When the VM/FW unit 309 determines that the target application is an authentication type application (YES in step S805), the processing proceeds to step S1201, unlike the first exemplary embodiment. On the other hand, when the VM/FW unit 309 determines that the target application is not an authentication type application (NO in step S805), the processing proceeds to step S806.

In step S1201, the VM/FW unit 309 checks whether there are any authentication type applications currently usable among applications installed as the extended applications 310. The VM/FW unit 309 checks presence or absence of an authentication type application which is currently usable, using the table for managing application information as illustrated in FIG. 7. For example, the VM/FW unit 309 checks whether there is an application, other than the target application, of which the type 603 is "Auth" and the activated state 604 is "Activated". The application determined to exist in step S1201 is of a type for user authentication and is an example of a second application different from the first application.

In the example illustrated in FIG. 7, User Auth 620 (an authentication type application) exists as the extended application 310. User Auth 620 is activated (the value of the activated state 604 is Activated) and in the disabled state (the value of the ON/OFF state 605 is OFF). In a case where the VM/FW unit 309 determines that there is an application of which type is an authentication type and which is currently usable among applications installed as the extended applications 310 (YES in step S1201), the processing proceeds to step S1202. On the other hand, in a case where the VM/FW unit 309 determines that there is no application of which type is an authentication type and which is currently usable among applications installed as the extended applications 310 (NO in step S1201), the processing proceeds to step S808. Subsequently, the VM/FW unit 309 performs similar processing to that according to the first exemplary embodiment.

In step S1202, before setting the value of the ON/OFF state 605 of the target application to OFF, the VM/FW unit 309 sets the value of the ON/OFF state 605 of User Auth 620 to ON to activate User Auth 620. Then, the processing proceeds to step S809. Subsequently, the VM/FW unit 309 performs similar processing to that according to the first exemplary embodiment. In this case, the VM/FW unit 309 activates the updated target application in step S813, sets the value of the ON/OFF state 605 of the authentication type application (User Auth 620) activated in step S1202 to deactivate the application, and instructs the UI unit 302 to update the screen in step S814.

According to the present exemplary embodiment, the VM/FW unit 309 activates another authentication type application when updating the target application. Alternatively, when updating the target application, the VM/FW unit 309 may instruct the UI unit 302 to display on the display unit 105 a screen for prompting the user to activate another authentication type application determined to exist in step S1201, instead of directly activating another authentication type application. The user activates another authentication type application as an alternative of the updated target application only when another application is necessary, and does not activate another application when it is not necessary. This enables the MFP 100 to reduce the load on processing for activating another authentication type application when another application is not necessary. The screen display processing by the UI unit 302 in this case is an example of display control processing for displaying a screen prompting activation of the second application.

The screen displayed in this case includes, for example, a message for notifying that the authentication type application is currently being updated and making an inquiry to the user about whether to activate an alternative application, and a button to be selected to specify the activation of an alternative application. When the VM/FW unit 309 detects the selection of a button for specifying the activation of an alternative application, the VM/FW unit 309 activates the application determined to exist in step S1201.

According to the present exemplary embodiment, as another authentication type application as an alternative of the application currently being updated, the MFP 100 uses an application installed as the extended application 310. However, as another authentication type application as an alternative of the application currently being updated, the MFP 100 may use, for example, an authentication type application originally provided in the OS 301.

The above-described processing according to the present exemplary embodiment makes it possible to achieve the effect obtained through the processing according to the first exemplary embodiment and also to eliminate downtime of the MFP 100 by utilizing another authentication application even while an authentication type application is being updated. Thus, user convenience can be improved.

According to an aspect of the present disclosure, update processing control can be changed according to whether an update target application is of a type for offering an authentication function.

To update an application, it is necessary to shut down the update target application in advance. In the case where an application offering a function of authenticating the user of a device is an update target application and if the application is shut down, the user authentication is disabled. According to the first exemplary embodiment and the second exemplary embodiment, an effect of avoiding a situation that unspecified users are allowed to freely operate the device can be obtained.

Further, update processing control can be changed according to whether an update target application is of a type for offering an authentication function.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-186029, filed Sep. 23, 2016, which is hereby incorporated by reference herein in its entirety.

What is claimed is:

1. An image forming apparatus to which an application program for the image forming apparatus is installed, the image forming apparatus comprising:
   one or more processors, when the one or more processors execute instructions, which acts as:
   an update unit configured to, in accordance with reception of an instruction for updating a login application, stop the login application, and update the login application, wherein another application different from the login application is in an executable state while the login application is updated by the update unit, and the login application is an application program for authenticating a user who logs in to the image forming apparatus; and
   a control unit configured to display a screen with which operations are unable to be performed on an operation unit of the image forming apparatus so that the image forming apparatus receives no operation to the another application through the operation unit while the login application is updated by the update unit.

2. The image forming apparatus according to claim 1, wherein the control unit performs control, in accordance with the update unit performing processing for updating the application, to execute another login application different from the login application and displays an authentication screen on the operation unit.

3. The image forming apparatus according to claim 1, wherein, in response to an update target application not being of a login application type, the control unit performs control to receive an input set via the operation unit.

4. The image forming apparatus according to claim 1, wherein, in response to an update target application being of a login application type, the control unit performs control not to receive an input set via the operation unit.

5. The image forming apparatus according to claim 1, wherein, in response to an update target application being of a login application type, the control unit displays a screen for causing an application different from the update target application to be activated.

6. The image forming apparatus according to claim 1, wherein, based on whether the update target application operating on a framework installed in the image forming apparatus is of a login application type or not of a login application type, the control unit changes control of processing for updating the update target application via the framework.

7. The image forming apparatus according to claim 1, further comprising:
   a determination unit configured to determine a type of an update target application,
   wherein, based on whether the determination unit determines that the update target application is of an application type for offering a user authentication function or is not of an application type for offering a user authentication function, the control unit changes control of processing for updating the update target application.

8. The image forming apparatus according to claim 1, wherein the control unit is configured to control the image forming apparatus being able to be operated via the operation unit in a case where the another application is updated by the update unit.

9. A method for controlling an image forming apparatus to which an application program for the image forming apparatus is installed, wherein, when instructions are executed by one or more processors, the method causes:
   in accordance with reception of an instruction for updating a login application, stopping the login application, and updating the login application, wherein another application different from the login application is in an executable state while the login application is updated, and the login application is an application program for authenticating a user who logs in to the image forming apparatus;
   displaying a screen with which that operations are unable to be performed on an operation unit of the image forming apparatus so that the image forming apparatus receives no operation to the another application through the operation unit while the login application updated.

10. A non-transitory storage medium storing instructions for executing a method for controlling an image forming apparatus to which an application program for the image forming apparatus is installed, wherein, when instructions are executed by at least one processor, the method causes:
   in accordance with reception of an instruction for updating a login application, stopping the login application, and updating the login application, wherein another application different from the login application is in an executable state while the login application is updated by the update unit, and the login application is an application program for authenticating a user who logs in to the image forming apparatus;
   displaying a screen with which operations are unable to be performed on an operation unit of the image forming apparatus so that the image forming apparatus receives no operation to the another application through the operation unit while the login application updated.

* * * * *